US 8,700,989 B2

(12) United States Patent
Kim

(10) Patent No.: US 8,700,989 B2
(45) Date of Patent: Apr. 15, 2014

(54) METHOD AND APPARATUS FOR TRANSMITTING XHTML-PRINT DOCUMENT IN MOBILE DEVICE

(75) Inventor: Dae-hyun Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1598 days.

(21) Appl. No.: 11/678,181

(22) Filed: Feb. 23, 2007

(65) Prior Publication Data

US 2007/0245233 A1 Oct. 18, 2007

Related U.S. Application Data

(60) Provisional application No. 60/791,424, filed on Apr. 13, 2006.

(30) Foreign Application Priority Data

May 12, 2006 (KR) .......................... 10-2006-43132

(51) Int. Cl.
*G06F 17/20* (2006.01)

(52) U.S. Cl.
USPC ........................................................ 715/234

(58) Field of Classification Search
USPC ........................................ 715/234, 273–277
See application file for complete search history.

(56) References Cited

U.S. PATENT DOCUMENTS

| 7,202,972 B1 | 4/2007 | Schwier et al. | |
| 2001/0051962 A1* | 12/2001 | Plotkin | 707/522 |
| 2002/0176112 A1 | 11/2002 | Miura | |
| 2003/0051210 A1* | 3/2003 | Collier et al. | 715/507 |
| 2004/0003343 A1* | 1/2004 | Liao et al. | 715/501.1 |
| 2004/0068698 A1 | 4/2004 | Wu et al. | |
| 2004/0243934 A1* | 12/2004 | Wood et al. | 715/517 |
| 2004/0252332 A1* | 12/2004 | McCoog et al. | 358/1.15 |
| 2004/0253990 A1* | 12/2004 | McCoog et al. | 455/566 |
| 2005/0113025 A1* | 5/2005 | Akamatsu et al. | 455/41.3 |
| 2005/0168776 A1* | 8/2005 | Yamaguchi | 358/1.15 |
| 2005/0183010 A1* | 8/2005 | Iwasaki | 715/517 |
| 2005/0231753 A1* | 10/2005 | Mertama et al. | 715/513 |
| 2005/0262049 A1* | 11/2005 | Somppi | 707/3 |
| 2005/0278614 A1* | 12/2005 | Aizikowitz et al. | 715/501.1 |
| 2006/0007490 A1* | 1/2006 | Silverbrook et al. | 358/1.15 |
| 2006/0028673 A1* | 2/2006 | Ryu et al. | 358/1.15 |

(Continued)

FOREIGN PATENT DOCUMENTS

| CN | 1734442 A | 2/2006 |
| EP | 1 376 388 | 1/2004 |

(Continued)

OTHER PUBLICATIONS

Grant, Melinda and Jim Bigelow, Eds. "XHTML-Print: W3C Proposed Recommendation Jan. 31, 2006" (45 pp).

(Continued)

*Primary Examiner* — Frank D Mills
(74) *Attorney, Agent, or Firm* — Staas & Halsey LLP

(57) ABSTRACT

Provided is a method and apparatus for transmitting a markup document in a mobile device, such as a cellular phone, which captures images. The method includes creating a markup document indicating certain predetermined content as fixed parts and certain predetermined content as variable parts, and requesting a printing of the markup document by separately transmitting the fixed parts and the variable parts.

23 Claims, 16 Drawing Sheets

(56) References Cited

U.S. PATENT DOCUMENTS

| | | | |
|---|---|---|---|
| 2006/0031256 A1* | 2/2006 | Bosworth et al. | 707/104.1 |
| 2006/0129632 A1* | 6/2006 | Blume et al. | 709/203 |
| 2006/0139674 A1* | 6/2006 | Oshima | 358/1.13 |
| 2006/0153616 A1* | 7/2006 | Hofmann | 400/62 |
| 2006/0164676 A1* | 7/2006 | Walker et al. | 358/1.15 |
| 2006/0238800 A1* | 10/2006 | Czudak et al. | 358/1.15 |
| 2006/0248454 A1* | 11/2006 | Giannetti | 715/517 |
| 2007/0063031 A1* | 3/2007 | Silverbrook et al. | 235/432 |
| 2007/0100866 A1* | 5/2007 | Binding et al. | 707/102 |

FOREIGN PATENT DOCUMENTS

| | | |
|---|---|---|
| EP | 1 489 813 | 12/2004 |
| JP | 2002-539562 | 11/2002 |
| JP | 2004-139460 | 5/2004 |
| JP | 2004-175095 | 6/2004 |
| JP | 2004-287865 | 10/2004 |
| JP | 2005-157769 | 6/2005 |
| WO | WO 2005/121943 | 12/2005 |

OTHER PUBLICATIONS

Search Report issued on Jun. 25, 2007 by the International Searching Authority for PCT International Application No. PCT/KR2007/1594.

Strategy Partners International Ltd., "AIIM User's Guided-Document and Content Output and Presentation." 2004, http://www.aiim.org.uk/download_files/aiimuserguides/4_Document_and_Content_Output_and_Presentation.pdf.

Korean Office Action for corresponding Korean Patent Application No.: 10-2006-0043132 (in English).

European Search Report dated Mar. 11, 2011, issued in corresponding European Patent Application No. 07745757.

Chinese Office Action for corresponding Chinese Patent Application No.: 200780010747.3 dated Apr. 28, 2010 (8 pgs).

European Office Action dated Sep. 20, 2011 issued in corresponding European Patent Application No. 07745757.0.

Japanese Office Action mailed Nov. 8, 2011 issues in corresponding Japanese Patent Application No. 2009-50286.

Chinese Office Action dated Mar. 22, 2012 issued in corresponding Chinese Patent Application No. 200780010747.3.

Japanese Notice of Allowance dated May 15, 2012 corresponds to Japanese Patent Application No. 209-505286.

\* cited by examiner

FIG. 5 (PRIOR ART)

```
Content-Type: application/vnd.pwg-multiplexed; type=application/vnd.pwg-xhtml-
print+xml CHK 1 509 MORE
Content-Type: application/vnd.pwg-xhtml-print+xml
Content-Location: UC1-T1.htm <?xml version="1.0" encoding="UTF-8"?>
    :
    @page{size:4in 6in; margin:0in}
    :
    <img src="castle.jpg" width="100%" height="100%"/>
CHK 2 688 MORE
Content-Type: image/jpeg
Content-Location: castle.jpg
    :
CHK 1 22 LAST
  </body>
</html>
CHK 2 214561 LAST
    :
CHK 0 0 LAST
```

FIG. 10

```
<?xml version="1.0" encoding="UTF-8"?>
<!DOCTYPE html PUBLIC "-//W3C//DTD XHTML-Print 1.0//EN"
"http://www.w3.org/MarkUp/DTD/xhtml-print10.dtd">
<html xmlns="http://www.w3.org/1999/xhtml">
  <head>
    <title>UC1-T2 : Fit-whole (Match width) Print</title>
    <style>
      @page{size:4in 6in; margin:0in}
      .ImgBox{width:100%; height:100%; overflow: hidden;}
      .FitWhole_MatchWidth{position: relative; top:
```
} FIXED PART 1

```
5.56%
```
} VARIABLE PART 1

```
; width:100%; height:
```
} FIXED PART 2

```
88.88%
```
} VARIABLE PART 2

```
;}
    </style>
  </head>
  <body>
    <div class="ImgBox">
      <img class="FitWhole_MatchWidth" src="
```
} FIXED PART 3

```
castle.jpg
```
} VARIABLE PART 3

```
"/>
    </div>
  </body>
</html>
```
} FIXED PART 4

FIG. 12

```
<?xml version="1.0" encoding="UTF-8"?>
<!DOCTYPE html PUBLIC "-//W3C//DTD XHTML-Print 1.0//EN"
"http://www.w3.org/MarkUp/DTD/xhtml-print10.dtd">
<html xmlns="http://www.w3.org/1999/xhtml">
   <head>
      <title>UC1-T4 : Fit-and-crop (Match height)
Print</title>
      <style>
        @page{size:4in 6in; margin:0in}
        .ImgBox{width:100%; height:100%; overflow: hidden;}
        .FitAndCrop_MatchHeight{position: relative; left:
```
} FIXED PART 1

```
-6.25%
```
} VARIABLE PART 1

```
; width:
```
} FIXED PART 2

```
112.5%
```
} VARIABLE PART 2

```
; height:100%;}
      </style>
   </head>
   <body>
      <div class="ImgBox">
         <img class="FitAndCrop_MatchHeight" src="
```
} FIXED PART 3

```
castle.jpg
```
} VARIABLE PART 3

```
"/>
      </div>
   </body>
</html>
```
} FIXED PART 4

FIG. 14

```
<?xml version="1.0" encoding="UTF-8"?>
<!DOCTYPE html PUBLIC "-//W3C//DTD XHTML-Print 1.0//EN"
"http://www.w3.org/MarkUp/DTD/xhtml-print10.dtd">
<html xmlns="http://www.w3.org/1999/xhtml">
   <head>
      <title>UC1-T5 : Fit-and-crop (Match width)
Print</title>
      <style>
        @page{size:4in 6in; margin:0in}
         .ImgBox{width:100%; height:100%; overflow: hidden;}
         .FitAndCrop_MatchWidth{position:relative; top:
```
} FIXED PART 1

```
-16.67%
```
} VARIABLE PART 1

```
; width:100%; height:
```
} FIXED PART 2

```
133.34%
```
} VARIABLE PART 2

```
;}
      </style>
   </head>
<body>
   <div class="ImgBox">
      <img class="FitAndCrop_MatchWidth" src="
```
} FIXED PART 3

```
legend.jpg
```
} VARIABLE PART 3

```
"/>
   </div>
</body>
</html>
```
} FIXED PART 4

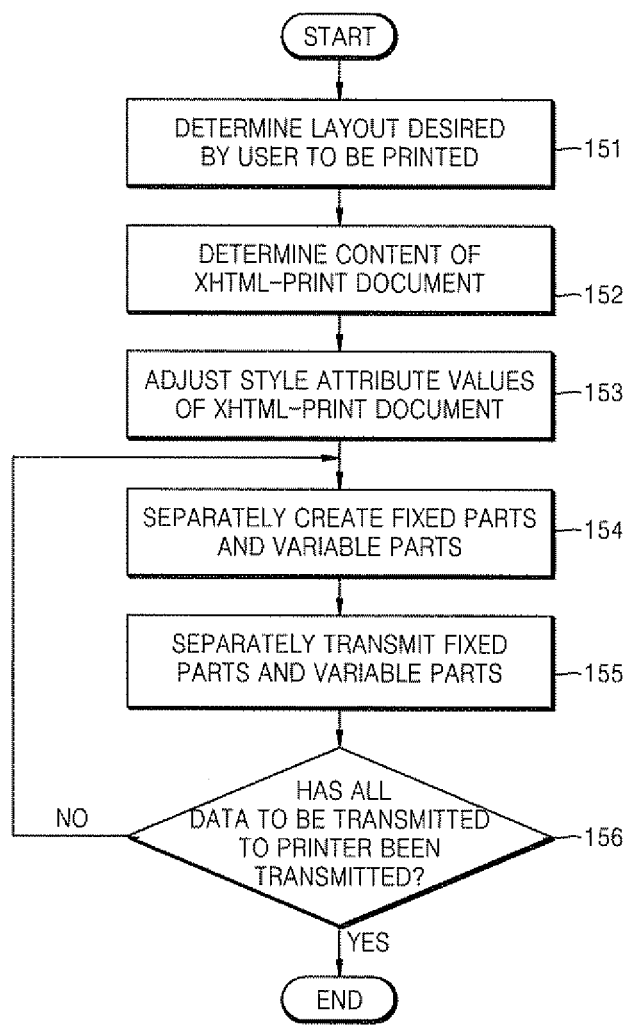

METHOD AND APPARATUS FOR TRANSMITTING XHTML-PRINT DOCUMENT IN MOBILE DEVICE

CROSS-REFERENCE TO RELATED APPLICATIONS

This application claims the benefit of U.S. Provisional Patent Application No. 60/791,424, filed on Apr. 13, 2006 in the U.S. Patent and Trademark Office, and the benefit of Korean Application No. 2006-43132, filed May 12, 2006 in the Korean Intellectual Property Office, the disclosures of which are incorporated herein by reference.

BACKGROUND OF THE INVENTION

1. Field of the Invention

Aspects of the present invention relate to a method and apparatus for transmitting a markup document in a mobile device, such as a cellular phone, which is able to capture images.

2. Description of the Related Art

Recently, technology for printing photographs in a remote printer by using a mobile device, such as a cellular phone, where the photographs have been captured using the mobile device, is being rapidly developed. In particular, while only simple format photographs transmitted from a mobile device could be printed in a printer in the past, technology for printing content (such as an extensible hyper text markup language (XHTML)-Print document), including various layouts and information designated by a user has become available on the market.

FIG. 1 is a flowchart illustrating a conventional method of printing content using a mobile device. As shown in FIG. 1, in operation 11, a user selects a print menu. In operation 12, the user selects a layout to be printed. In operation 13, the user selects content to be printed. In operation 14, the user adjusts the layout selected in operation 12. Operations 11 through 14 correspond to operations conducted while using a user interface portion.

In operation 15, the mobile device creates an XHTML-Print document based on the user selection of operations 11 through 14. In operation 16, the mobile device creates Multipurpose Internet Mail Extensions (MIME)-Multiplexed format XHTML-Print data containing the XHTML-Print document created in operation 15. Operations 15 and 16 correspond to operations conducted while using a content creation portion.

In operation 17, the mobile device transmits the MIME-Multiplexed format XHTML-Print data created in operation 16 to a printer. In operation 18, the printer receives the MIME-Multiplexed format XHTML-Print data. In operation 19, the printer analyzes the MIME-Multiplexed format XHTML-Print data. In operation 20, the printer prints rendering data of the XHTML-Print document, which is a result of the analysis performed in operation 19. Operations 17 through 20 correspond to operations conducted while using a content transfer and print portion.

FIG. 2 is a diagram to explain a conventional process of creating transfer data. As shown in FIG. 2, data corresponding to reference numeral 21 is an XHTML-Print document that is created according to the user selections of operations 11 through 13 of FIG. 1. Data corresponding to reference numeral 22 is an XHTML-Print document that is obtained by an adjustment of style attribute values according to the user adjustment of operation 14. Data corresponding to reference numeral 23 is MIME-Multiplexed format XHTML-Print data containing the XHTML-Print document. Lastly, data corresponding to reference numeral 24 is the MIME-Multiplexed format XHTML-Print data that is divided into transfer units such as packets.

However, when a user modifies a layout or replaces an image of created MIME-Multiplexed format XHTML-Print data, modified MIME-Multiplexed format XHTML-Print data must be recreated. This is a significant burden for mobile devices having insufficient resources (such as a memory resource), and low specification hardware. In particular, since MIME-Multiplexed format XHTML-Print data contains bulk data (such as images), a bulk memory resource is required for mobile devices to create MIME-Multiplexed format XHTML-Print data.

SUMMARY OF THE INVENTION

Aspects of the present invention provide a method and apparatus to smoothly transmit an extensible hyper text markup language (XHTML)-Print document indicating content desired by a user to be printed, even in a mobile device having an insufficient memory resource and low specification hardware.

An aspect of the present invention also provides a computer readable recording medium having a computer readable program stored thereon to execute the method.

According to an aspect of the present invention, there is provided a method of transmitting a markup document, the method comprising: creating a markup document indicating certain predetermined content as fixed parts and certain predetermined content as variable parts, and requesting a printing of the markup document by separately transmitting the fixed parts and the variable parts.

According to another aspect of the present invention, there is provided a computer readable recording medium having a computer readable program stored thereon to execute the method of transmitting a markup document.

According to another aspect of the present invention, there is provided an apparatus for transmitting a markup document, the apparatus comprising: a creator to create a markup document that indicates certain predetermined content as fixed parts and certain predetermined content as variable parts, and a transmitter to request a printing of the markup document by separately transmitting the fixed parts and the variable parts.

According to another aspect of the present invention, there is provided a printing method comprising: separately receiving fixed parts and variable parts included in a markup document that respectively indicate certain predetermined content; analyzing the received fixed parts and the received variable parts as a single markup document; and printing a result of the analysis.

According to another aspect of the present invention, there is provided a computer readable recording medium having a computer readable program stored thereon to execute the printing method.

According to another aspect of the present invention, there is provided a printing apparatus comprising: a receiver to separately receive fixed parts and variable parts included in a markup document that respectively indicate certain predetermined content; an analyzer to analyze the received fixed parts and the received variable parts as a single markup document; and a print engine to print a result of the analysis.

According to another aspect of the present invention, there is provided a computer readable recording medium storing a data structure comprising: a field in which a number of fixed parts, a number of variable parts, and a creation list indicating an arrangement order of the fixed parts and the variable parts, which are included in a markup template, are recorded; a field in which a fixed part list to identify each of the fixed parts is recorded; and a field in which a variable part list to identify each of the variable parts is recorded.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates conventional MIME-Multiplexed format XHTML-Print data;

FIG. 10 illustrates a Fit-Whole (Match Width) Print format XHTML-Print template according to an embodiment of the present invention;

FIG. 12 illustrates a Fit-and-Crop (Match Height) Print format XHTML-Print template according to an embodiment of the present invention;

FIG. 14 illustrates a Fit-and-Crop (Match Width) Print format XHTML-Print template according to an embodiment of the present invention;

FIG. 15 is a flowchart illustrating a content print requesting method according to an embodiment of the present invention.

DETAILED DESCRIPTION OF THE EMBODIMENTS

Figure 1:
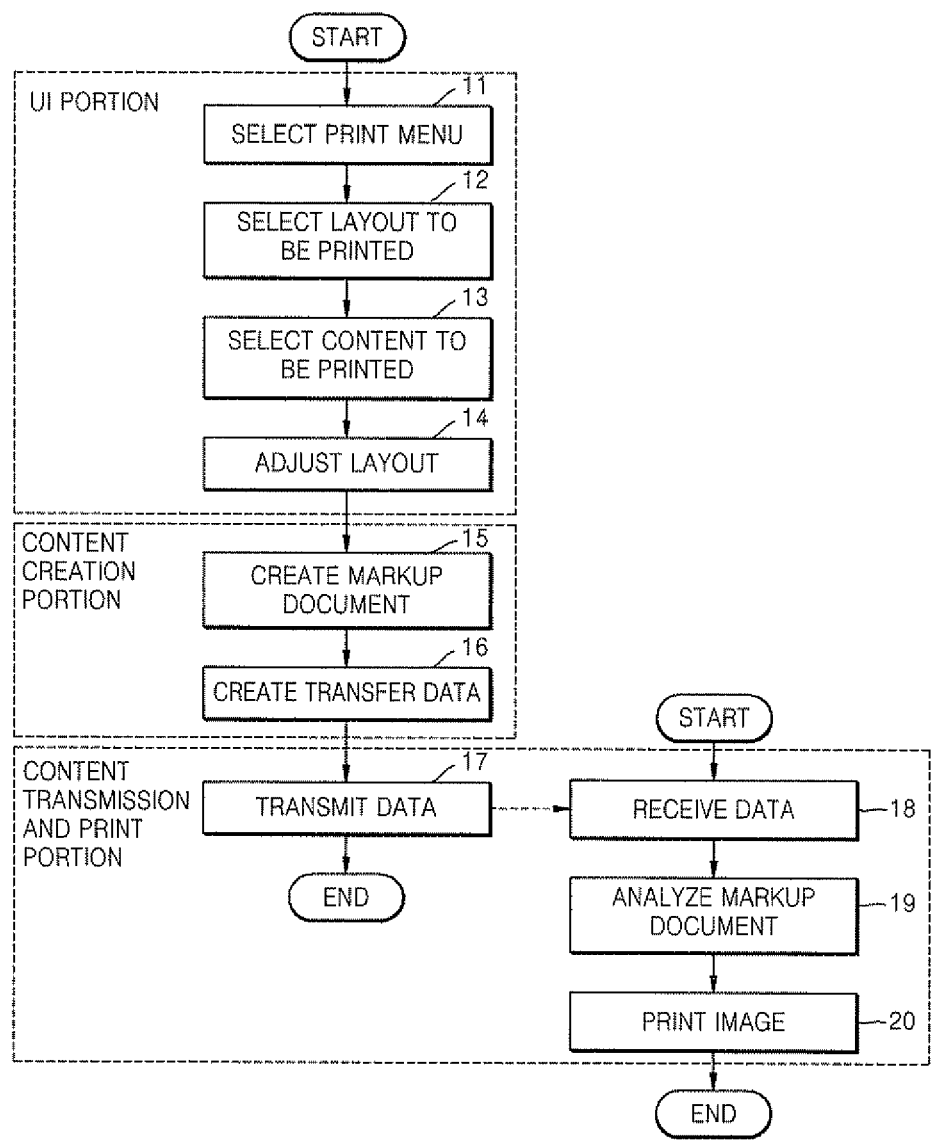
FIG. 1 is a flowchart illustrating a conventional method of printing content using a mobile device.
Figure 2:
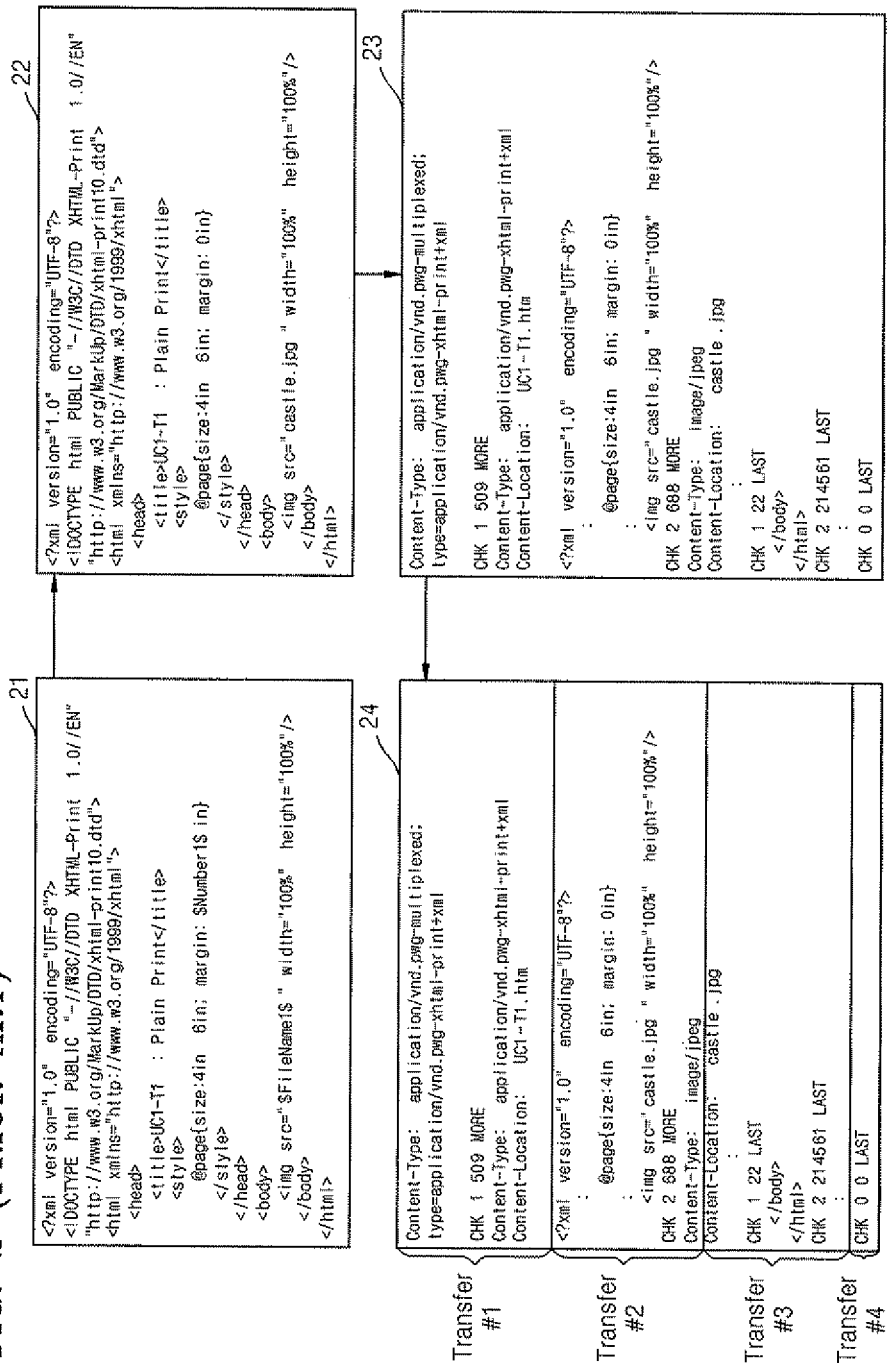
FIG. 2 is a diagram to explain a conventional process of creating transfer data.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
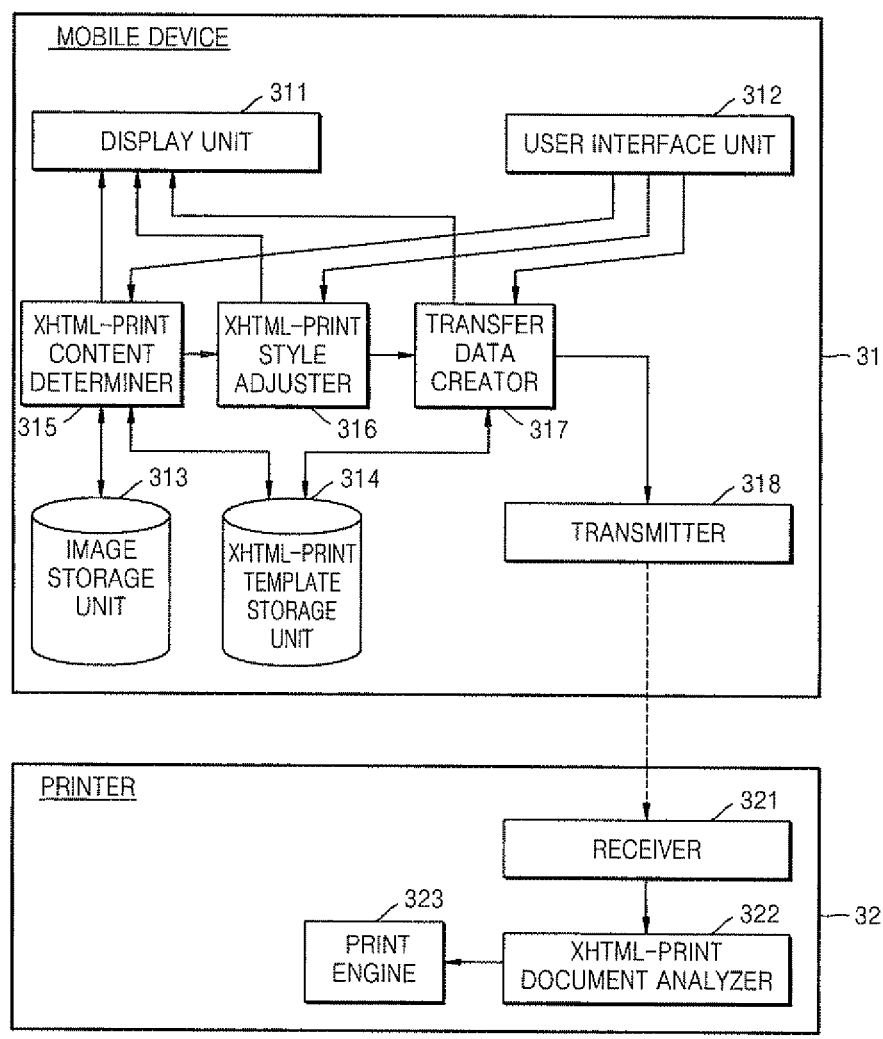
FIG. 3 is a block diagram of an image printing system according to an embodiment of the present invention.

FIG. 3 is a block diagram of an image printing system according to an embodiment of the present invention. As shown in FIG. 3, an image print requesting apparatus of a mobile device 31 according to an embodiment of the invention includes a display unit 311, a user interface unit 312, an image storage unit 3137 an extensible hyper text markup language (XHTML)-Print template storage unit 314, an XHTML-Print content determiner 315, an XHTML-Print style adjuster 316, a transfer data creator 317, and a transmitter 318. While not required, it is understood that the mobile device 31 can be a cell phone, a camera, and/or a media player, etc., and that aspects can be implemented in non-mobile devices.

The display unit 311 displays an image related to an XHTML-Print document to a user. The user interface unit 312 receives information regarding the XHTML-Print document from the user who has viewed the image displayed by the display unit 311. The image storage unit 313 stores a plurality of images captured by the user using the mobile device 31 or a plurality of images received from an external device. Of course, it is understood that the image storage unit 313 can stored additional data and/or images.

The XHTML-Print template storage unit 314 stores various XHTML-Print templates corresponding to content layouts that may be set by the XHTML-Print content determiner 315. In particular, according to the shown embodiment, the XHTML-Print template storage unit 314 stores XHTML-Print templates created in a markup document format that is based on an XHTML-Print specification the disclosure of which is incorporated herein by reference. Although the markup document described below is an XHTML-Print document, it will be understood by those of ordinary skill in the art that the present invention may be applicable with markup documents having other formats.

Figure 4:
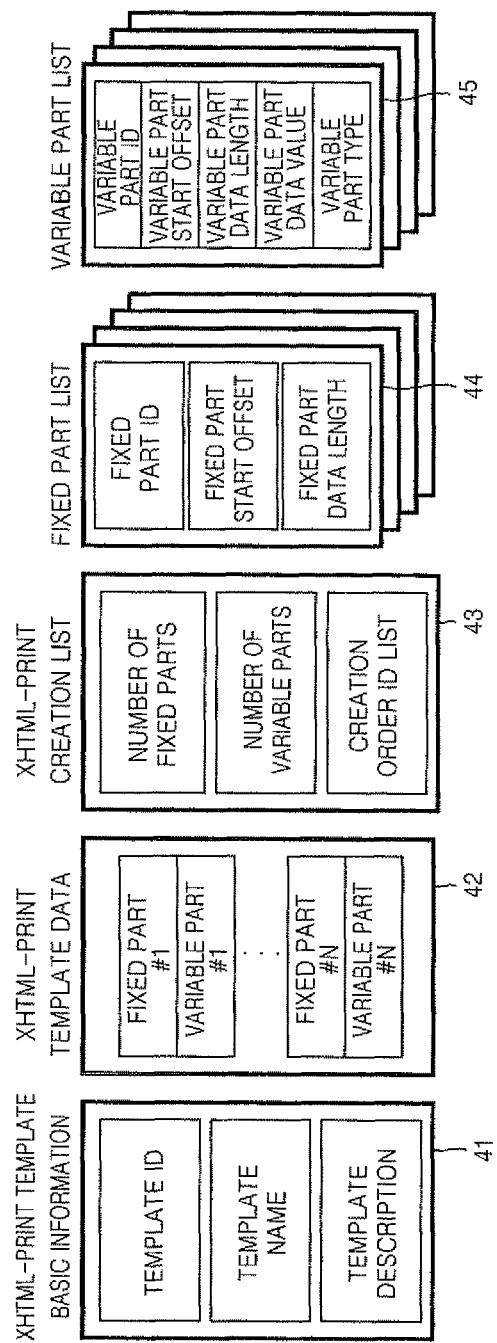
FIG. 4 illustrates a storage format of an XHTML-Print template according to an embodiment of the present invention.

FIG. 4 illustrates a storage format of an XHTML-Print template according to an embodiment of the present invention. As shown in FIG. 4, a single XHTML-Print template is stored in a format containing XHTML-Print template basic information 41, XHTML-Print template data 42, an XHTML-Print creation list 43, a fixed part list 44, and a variable part list 45. That is, the XHTML-Print template storage unit 314 has a data structure including a field in which the XHTML-Print template basic information 41 is recorded, a field in which the XHTML-Print template data 42 is recorded, a field in which the XHTML-Print creation list 43 is recorded, a field in which the fixed part list 44 is recorded, and a field in which the variable part list 45 is recorded.

The XHTML-Print template basic information 41 comprises template identification (ID), a template name, and a template description, which correspond to information that identifies each XHTML-Print template. The template ID, the template name, and the template description are basic data that are provided to the user to allow for a selection of a user desired layout. In particular, the template description may be text and/or an image, but is not limited to thereto.

The XHTML-Print template data 42 is data that is used by the transfer data creator 317 and data of an XHTML-Print template that includes fixed parts corresponding to a layout of an XHTML-Print document, which is a style selectable markup document, and variable parts corresponding to variable attribute values of the XHTML-Print document, which are user modifiable. Default values that may be set or changed in advance are recorded as the variable attribute values of the XHTML-Print document. In particular, the XHTML-Print template data 42 is Multi-purpose Internet Mail Extensions (MIME)-Multiplexed format XHTML-Print data that contains metadata required for the XHTML-Print document and a MIME-Multiplexed protocol. However, it is understood that, in an embodiment of the invention, the XHTML-Print template data 42 may contain metadata required for the XHTML-Print document and other types of protocols, or only data related to the XHTML-Print document.

The XHTML-Print creation list 43 includes information that indicates a number of the fixed parts, a number of the variable parts, and an arrangement order of the fixed parts and the variable parts, which are included in an XHTML-Print template. The fixed part list 44 comprises information to identify each of the fixed parts included in the XHTML-Print template. The variable part list 45 comprises information to identify each of the variable parts included in the XHTML-Print template.

FIG. 5 illustrates conventional MIME-Multiplexed format XHTML-Print data. As shown in FIG. 5, the conventional MIME-Multiplexed format XHTML-Print data is divisible into variable parts corresponding to variable attribute values, such as "0" in "margin:0in," and "castle.jpg," and fixed parts corresponding to the other fixed markup content. In particular, parts written in bold and encircled by the dotted lines in FIG. 5 indicate MIME-Multiplexed content heads. These parts are also divisible into fixed parts and variable parts. According to an embodiment of the present invention, the fixed parts and variable parts are divided and then transmitted to a printer 32. Here, the storage form of an XHTML-Print template, which is illustrated in FIG. 4, allows for a relatively easy division and transmission of the fixed parts and the variable parts.

Figure 6:
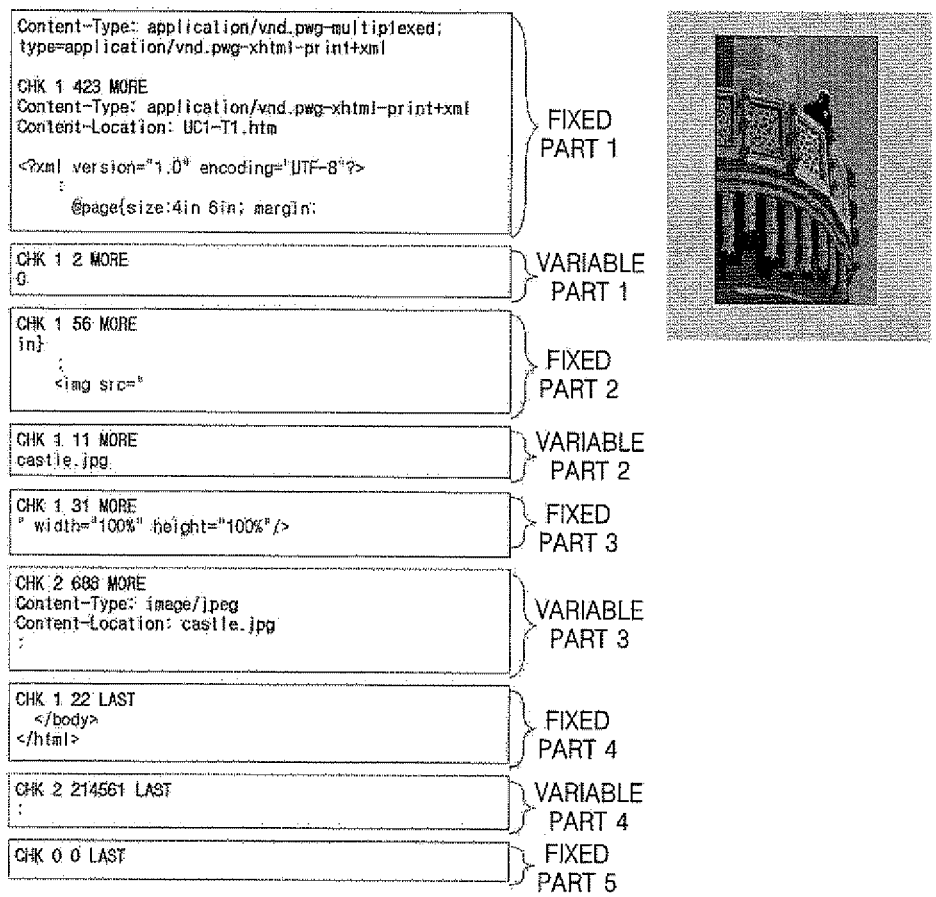
FIG. 6 illustrates MIME-Multiplexed format template data according to an embodiment of the present invention.

FIG. 6 illustrates MIME-Multiplexed format template data according to an embodiment of the present invention. As shown in FIG. 6, when the MIME-Multiplexed format template data of FIG. 5 is referred to, a creation order list of the MIME-Multiplexed format template data is as follows: the number of the fixed parts is 5, the number of the variable parts is 4, and fixed part #1 is a creation order ID list. The creation order ID list (i.e., fixed part #1) is followed by variable part #1, fixed part #2, variable part #2, fixed part #3, variable part #3, fixed part #4, variable part #4, and fixed part #5.

In addition, when the fixed part list 44 of FIG. 4 is created with reference to the MIME-Multiplexed format template data of FIG. 5, a list of five fixed parts is created. When the variable part list 45 of FIG. 4 is created with reference to the MIME-Multiplexed format template data of FIG. 5, a list of four variable parts is created. In particular, since the variable part #2 and the variable part #3 are each parts of directly designated image data, a variable part data type in the variable part list 45 may be written as "Image." If content desired by the user to be printed does not match a size of an image space assigned to an XHTML-Print template, the transfer data creator 317 may create a new sized chunk, according to a value input by the user, by neglecting a start offset and a data length.

Figure 7:
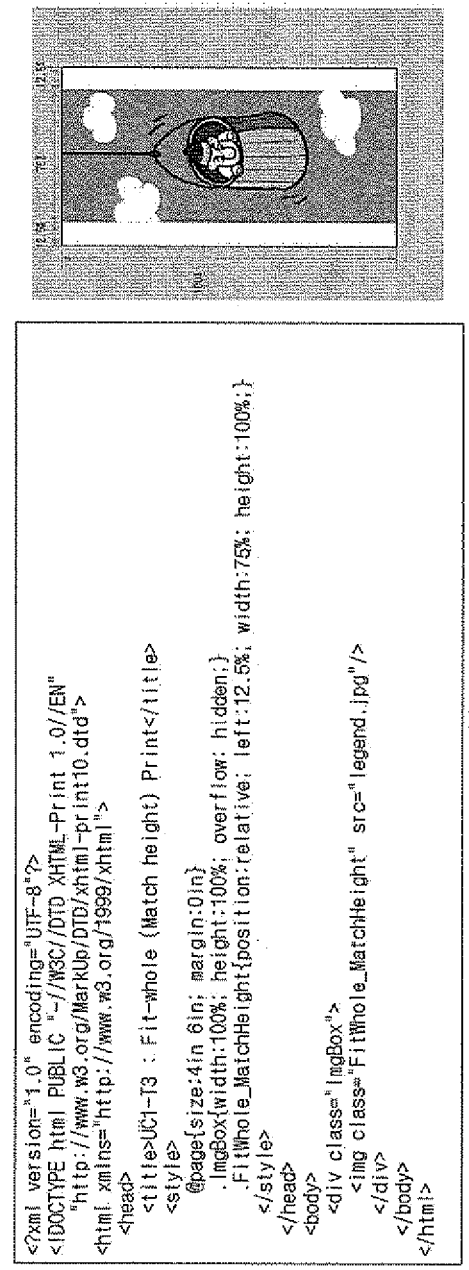
FIG. 7 illustrates a conventional simple XHTML-Print document.

FIG. 7 illustrates a conventional simple XHTML-Print document. The simple XHTML-Print document illustrated in FIG. 7 is also presented as a document type XHTML-Print template according to an embodiment of the present invention illustrated in FIG. 8, which is divided into fixed parts and variable parts.

Figure 8:
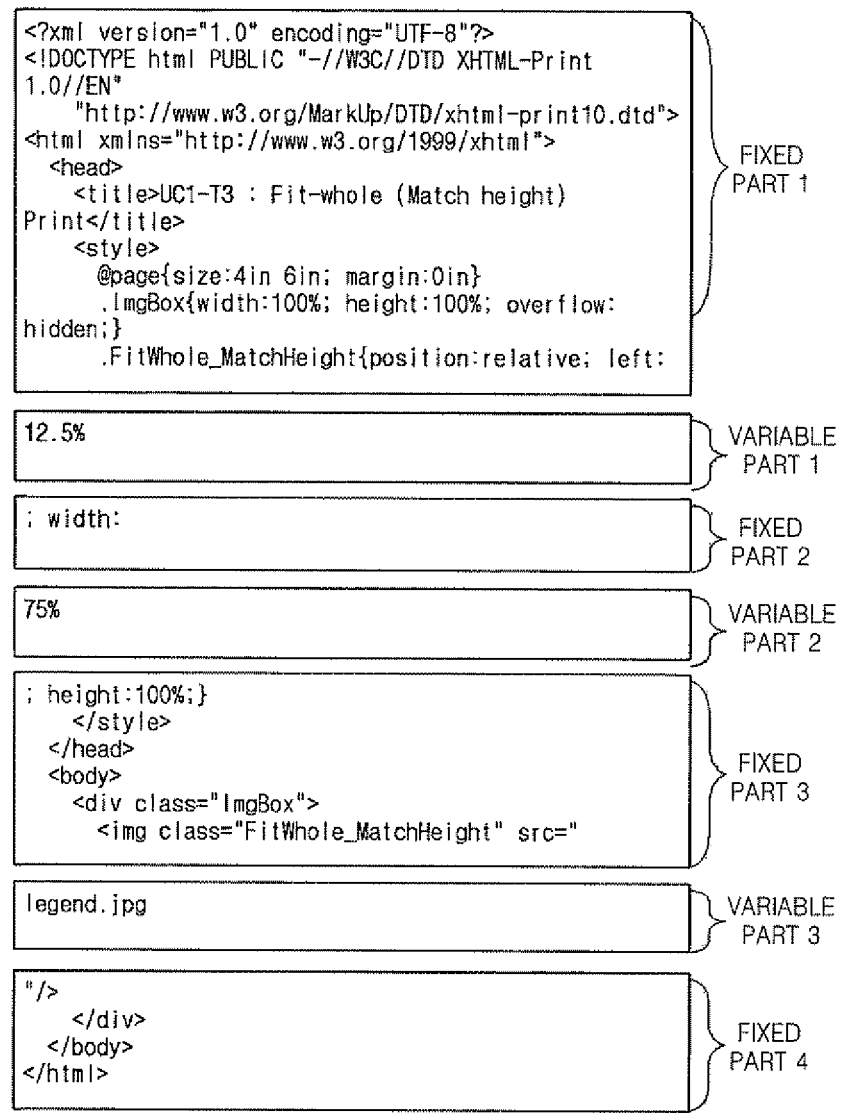
FIG. 8 illustrates a simple XHTML-Print template according to an embodiment of the present invention.

FIG. 8 illustrates a simple XHTML-Print template according to an embodiment of the present invention. As shown in FIG. 8, when the simple XHTML-Print document of FIG. 7 is referred to, a creation order list of the XHTML-Print data is as follows the number of the fixed parts is 4, the number of the variable parts is 4, and fixed part #1 is a creation order ID list. The creation order ID list is followed by variable part #1, fixed part #2, variable part #2, fixed part #3, variable part #3, and fixed part #4. In addition, when the fixed part list 44 is created with reference to the simple XHTML-Print document of FIG. 7, a list of four fixed parts is created, and when the variable part list 45 is created by referring to the simple XHTML-Print document of FIG. 7, a list of three variable parts is created.

Figure 9:
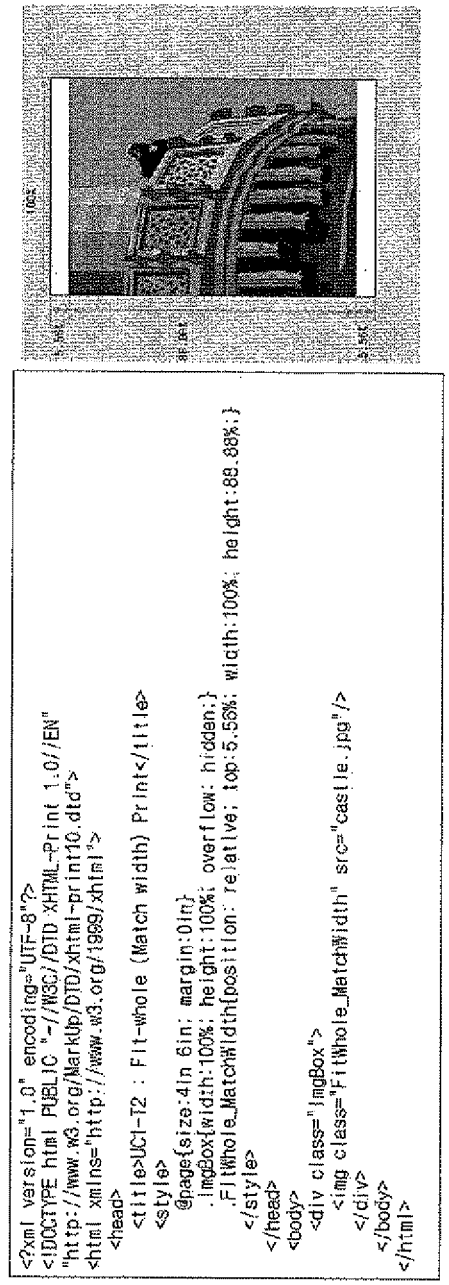
FIG. 9 illustrates a conventional Fit-Whole (Match Width) Print format XHTML-Print document.
Figure 11:
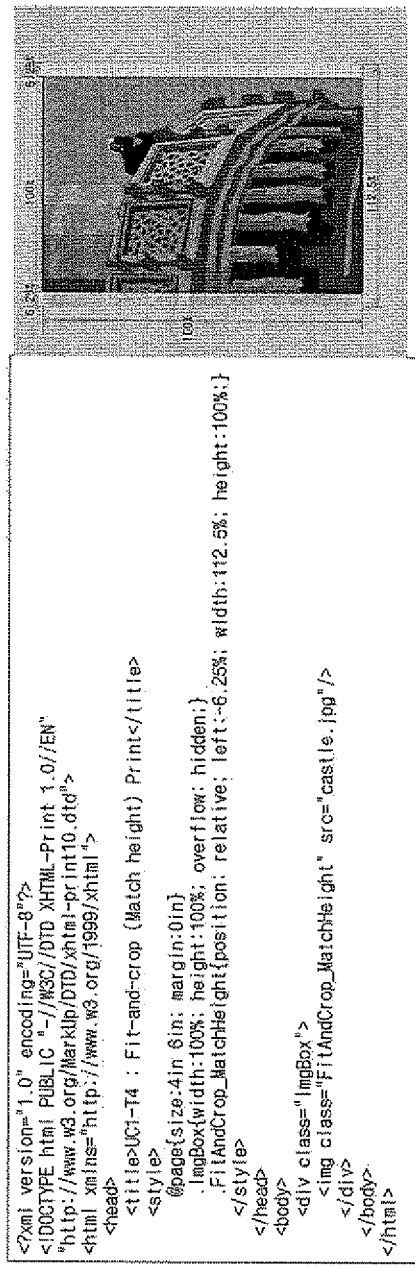
FIG. 11 illustrates a conventional Fit-and-Crop (Match Height) Print format XHTML-Print document.
Figure 13:
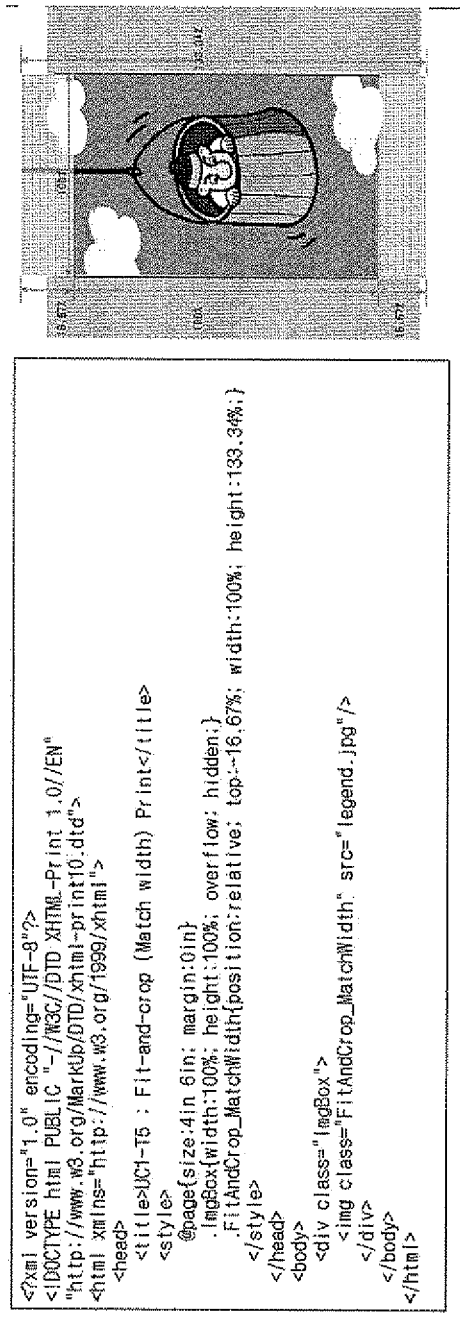
FIG. 13 illustrates a conventional Fit-and-Crop (Match Width) Print format XHTML-Print document.

FIG. 9 illustrates a conventional Fit-Whole (Match Width) Print format XHTML-Print document. FIG. 10 illustrates a Fit-Whole (Match Width) Print format XHTML-Print template according to an embodiment of the present invention. FIG. 11 illustrates a conventional Fit-and-Crop (Match Height) Print format XHTML-Print document. FIG. 12 illustrates a Fit-and-Crop (Match Height) Print format XHTML-Print template according to an embodiment of the present invention. FIG. 13 illustrates a conventional Fit-and-Crop (Match Width) Print format XHTML-Print document. FIG. 14 illustrates a Fit-and-Crop (Match Width) Print format XHTML-Print template according to an embodiment of the present invention.

Referring to FIGS. 9 through 14, as in FIGS. 5 through 8, conventional XHTML-Print documents may be presented as XHTML-Print templates according to embodiments of the present invention. In particular, by storing XHTML-Print templates having the above-described data structures in the XHTML-Print template storage unit 314, XHTML-Print data is relatively easily divided into fixed parts and variable parts and is transmitted without the need to create entire XHTML-Print data as in the prior art.

Referring back to FIG. 3, the XHTML-Print content determiner 315 determines a user desired layout to be printed by selecting an XHTML-Print template corresponding to a user desired content layout from among the XHTML-Print templates stored in the XHTML-Print template storage unit 314. This determination may be made in accordance with a value input by the user through the user interface unit 312. In addition, the XHTML-Print content determiner 315 determines at least one image corresponding to the user desired layout to be printed, by writing source attribute values of image(s) designated by the user in the XHTML-Print template. The XHTML-Print determiner 315 further determines at least one text corresponding to the user desired layout to be printed by writing text(s) that is (are) input by the user in the XHTML-Print template. That is, the XHTML-Print content determiner 315 determines content of the XHTML-Print document.

In more detail, the XHTML-Print content determiner 315 is able to select an XHTML-Print template corresponding to a layout designated by the user from among the XHTML-Print templates stored in the XHTML-Print template storage unit 314. The XHTML-Print content determiner accomplishes this by using the XHTML-Print template basic information 41, such as IDs indicating the XHTML-Print templates stored in the XHTML-Print template storage unit 314.

As is described above, the XHTML-Print template is divisible into fixed parts and variable parts. In particular, the fixed parts are fixed markup parts corresponding to the layout of the XHTML-Print document, and the variable parts are variable attribute values of the XHTML-Print document, which are user modifiable. In addition, the templates used in the current embodiment include templates that constitute a layout with a single image, such as a Plain Print template, a Fit-Whole (Match Width) Print template, a Fit-Whole (Match Height) Print template, a Fit-and-Crop (Match Width) Print template, and a Fit-and-Crop (Match Height) Print template. The templates used in the current embodiment further include templates that constitute a layout with a plurality of images, such as an Index Printing template and a Clone Printing template. However, it is understood that other templates are available beyond the disclosed examples.

The XHTML-Print style adjuster 316 minutely adjusts a style, i.e. a layout, of the XHTML-Print document indicating the content determined by the XHTML-Print content determiner 315. This is accomplished by an adjustment of style attribute values of the XHTML-Print document indicating the content determined by the XHTML-Print content determiner 315 according to a value input by the user through the user interface unit 312. In addition, the XHTML-Print style adjuster 316 creates the XHTML-Print document indicating the content desired by the user to be printed by using the adjustment.

The style attribute values used in the current embodiment include markup tag attribute values such as "position," "size," and "rotation" of the image and text used by the XHTML-Print template. For example, the XHTML-Print style adjuster 316 performs minute adjustment, such as horizontal movement, vertical movement, and size adjustment, of the at least one image determined by the XHTML-Print content determiner 315 using the XHTML-Print template.

The transfer data creator 317 creates data to be transmitted to the printer 32 using the XHTML-Print document having the style adjusted by the XHTML-Print style adjuster 316. In particular, according to the current embodiment, the transfer data creator 317 creates the data to be transmitted to the printer 32 by dividing the data into the fixed parts and the variable parts without creating an entirely new amount of data to be transmitted to the printer 32 as in the prior art.

In more detail, the transfer data creator 317 creates the fixed parts of the XHTML-Print data to be transmitted to the printer 32 by separating the fixed parts from the XHTML-Print template data 42 stored in the XHTML-Print template storage unit 314. The transfer data creator 317 accomplishes this with reference to the XHTML-Print creation list 43 and the fixed part list 44 stored in the XHTML-Print template storage unit 314. The transfer data creator 317 also creates the variable parts by separating the variable parts, i.e., style attribute values, which are adjusted by the XHTML-Print style adjuster 316 from the XHTML-Print document created by the XHTML-Print style adjuster 316. The transfer data creator 317 accomplishes this with reference to the XHTML-Print creation list 43 and the variable part list 45 stored in the XHTML-Print template storage unit 314.

As is described above, according an aspect of the invention, the XHTML-Print data to be transmitted to the printer 32 is created by a separation of the fixed parts and the variable parts without a need for a creation of an entire MIME-Multiplexed format XHTML-Print data. In particular, even when the user modifies a layout or replaces images, only variable parts corresponding the modification or replacement are separately created and transmitted. Thus, the entire MIME-Multiplexed format XHTML-Print data does not have to be newly created.

Since an XHTML-Print document and images corresponding thereto are transmitted in the form of MIME-Multiplexed format XHTML-Print data, a transmission rate of the MIME-Multiplexed format XHTML-Print data may be high. However, the printer 32 must be able to support this high transmission rate. If the printer 32 is not able to support a processing of MIME-Multiplexed format XHTML-Print data, the transfer data creator 317 may determine that it is necessary to separate and create only the fixed parts and the variable parts included in the XHTML-Print document.

The transmitter 318 requests that the printer 32 print the markup document desired by the user to be printed, by separately transmitting the transfer data (i.e., the separated fixed parts and variable parts), created by the transfer data creator 317 to the printer 32. In particular, it will be understood by those of ordinary skill in the art that the transmitter 318 performs transmission and reception using various communication media including wireless communication media, such as infrared communication, Bluetooth communication, IEEE 802.11 wireless local area network (WLAN) communication, and so on, wired communication media, or combinations thereof, and separately transmits transfer data in a packet or block basis according to protocol or middleware used in communication between the mobile device 31 and the printer 32.

An image printing apparatus included in the printer 32 according to the shown embodiment includes a receiver 321, an XHTML-Print document analyzer 322, and a print engine 323. The receiver 321 separately receives the fixed parts and the variable parts included in MIME-Multiplexed format data, which contains an XHTML-Print document from the mobile device 31. The receiver 321 discards everything except the XHTML-Print document from the MIME-Multiplexed format data in which an additional markup document to transmit the MIME-Multiplexed format data or metadata for a data transmission protocol is inserted. Thus, only the XHTML-Print document is input to the XHTML-Print document analyzer 322. The receiver 321 may receive the fixed parts and the variable parts included in the XHTML-Print document.

The XHTML-Print document analyzer 322 creates rendering data that is printable by the print engine 323 by analyzing the fixed parts and the variable parts that are received from the mobile device 31 through the receiver 321 as a single XHTML-Print document. According to the current embodiment of the invention, the analysis of an XHTML-Print document refers to all processes of parsing and rendering the XHTML-Print document, and rendering data of the XHTML-Print document refers to data output by passing through all these processes, i.e., RGB data which may be directly printed or displayed by printers or display units, respectively. The print engine 323 prints the rendering data of the XHTML-Print document, which is a result of the analysis by the XHTML-Print document analyzer 322, on a print medium. However, it is understood that the XHTML-Print document could also be stored, and/or transferred to a remote printer to be printed after being received at the receiver 32.

While the present invention has been described as employing a printer 32 to print the markup document, it is understood that other image forming apparatuses could be used. These image forming apparatuses include, but are not limited to, copiers, scanners, facsimiles, etc.

FIG. 15 is a flowchart illustrating a content print requesting method according to an embodiment of the present invention. As shown in FIG. 15, the content print requesting method includes operations that are sequentially processed by the mobile device 31 of FIG. 3. Thus, although descriptions may be omitted in the current embodiment, the descriptions of the mobile device 31 illustrated in FIG. 3 are also applicable to the content print requesting method according to the current embodiment.

In operation 151, the mobile device 31 determines a user desired layout to be printed, by a selection of an XHTML-Print template corresponding to a user desired content layout from among XHTML-Print templates stored in the XHTML-Print template storage unit 314 according to a value input by the user through the user interface unit 312. However, it is understood that, if only a single layout exists, the determining can be done with selecting in other aspects.

In operation 152, the mobile device 31 determines a content of an XHTML-Print document by writing source attribute values of image(s) designated by the user in the XHTML-Print template text(s) input by the user in the XHTML-Print template selected in operation 151. In operation 153, the mobile device 31 creates the XHTML-Print document indicating the content desired by the user to be printed, by adjusting style attribute values of the XHTML- Print document indicating the content, which is determined in operation 152, according to a value input by the user through the user interface unit 312. In operation 154, the mobile device 31 creates data to be transmitted to the printer 32 by dividing the XHTML-Print document, having a style adjusted in operation 153, into fixed parts and variable parts.

In operation 155, the mobile device 31 sends a request to the printer 32 to print a markup document desired by the user to be printed, by separately transmitting the transfer data (i.e., the divided fixed parts and variable parts), created in operation 154, to the printer 32.

In operation 156, if the fixed parts and variable parts are transmitted so that the entire data is transmitted to the printer 32, the mobile device 31 ends this process. If the fixed parts and variable pads are not transmitted so that the entire data is transmitted to the printer 32, the mobile device 31 proceeds to operation 154.

Figure 16:
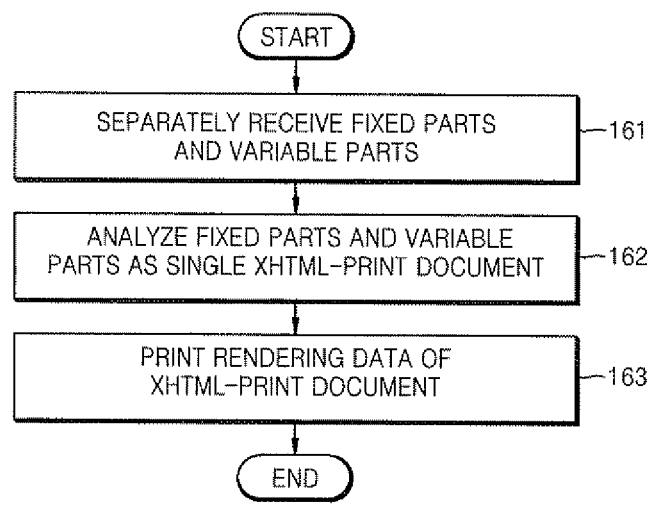
FIG. 16 is a flowchart illustrating a content printing method according to an embodiment of the present invention.

FIG. 16 is a flowchart illustrating a content printing method according to an embodiment of the present invention. As shown in FIG. 16, the content printing method includes operations that are sequentially processed by the printer 32 of FIG. 3. Thus, although descriptions may be omitted in the current embodiment, the descriptions of the printer 32 illustrated in FIG. 3 can also be applied to the content printing method according to the current embodiment.

In operation 161, the printer 32 receives fixed parts and variable parts included in MIME-Multiplexed format data which contains an XHTML-Print document or fixed parts and variable parts included in an XHTML-Print document from the mobile device 31. In operation 162, the printer 32 creates rendering data of the XHTML-Print document that is printable by the print engine 323 by analyzing the fixed parts and variable parts that are received from the mobile device 31 through the receiver 321; as a single XHTML-Print document. In operation 163, the printer 32 prints the rendering data of the XHTML-Print document on a print medium.

The embodiments of the present invention may be written as computer programs and may be implemented in general-use digital computers and/or processors that execute the programs using a computer readable recording medium. Examples of the computer readable recording medium include magnetic storage media (e.g., ROM, floppy disks, hard disks, etc.), optical recording media (e.g., CD-ROMs, or DVDs), firmware, and storage media such as carrier waves (e.g., transmission through the Internet).

As is described above, according to aspects of the present invention, a mobile device creates an XHTML-Print document indicating content desired by a user to be printed, by dividing the XHTML-Print document into fixed parts and variable parts, and separately transmits the fixed parts and variable parts to a printer. Accordingly, the printer is able to print the content without creating entire MIME-Multiplexed format XHTML-Print data in the mobile device. In addition, even when the user modifies a layout or replaces images, only variable parts corresponding to the modification or replacement can be separately created and transmitted, and thus, the entire MIME-Multiplexed format XHTML-Print data does not have to be newly created. Thus, an XHTML-Print document indicating content desired by a user to be printed may be relatively easily created and transmitted even in a mobile device having insufficient resources, such as a memory resource, and low specification hardware.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of transmitting a markup document comprising:
    creating a markup document using a mobile device indicating certain predetermined content as fixed parts and other predetermined content as variable parts, the fixed parts including a layout of the markup document, the variable parts including at least one image corresponding to the layout, at least one text corresponding to the layout, and a modified layout of the markup document adjusted by a user, and creating of the markup document including creating Multi-purpose Internet Mail Extensions (MIME)-Multiplexed format data containing the markup document as the fixed parts and the variable parts; and
    requesting a printing of the markup document from the mobile device by separately transmitting the fixed parts and the variable parts to a printer,
    wherein the requesting includes requesting a printing of the markup document by separately transmitting the fixed parts and the variable parts without creating the entire MIME-Multiplexed format data in the mobile device.

2. The method according to claim 1, wherein the fixed parts comprise a fixed markup portion corresponding to a non-modifiable layout of the markup document, and the variable parts further comprise a modifiable variable attribute value portion of the markup document.

3. The method according to claim 1, further comprising selecting a markup template corresponding to an image layout desired by the user to be printed from among markup templates, wherein the creation of the markup document comprises creating the fixed parts are created with reference to fixed parts of the selected markup template.

4. The method according to claim 3, wherein the fixed parts are created with reference to a number of the fixed parts, a number of the variable parts, a creation list indicating an arrangement order of the fixed parts and variable parts, and a fixed part list to identify each of the fixed parts that are included in the markup template.

5. The method according to claim 1, further comprising:
    adjusting variable parts of the markup document; and
    creating the markup document based on the adjustment, wherein, in the creating of the markup document comprises creating the variable parts with reference to the adjusted variable parts.

6. The method according to claim 5, wherein the variable parts are created with reference to a number of the fixed parts, a number of the variable parts, a creation list indicating an arrangement order of the fixed parts and variable parts, and a variable part list to identify each of the variable parts that are included in a markup template.

7. A non-transitory computer readable writing medium having a computer readable program stored thereon to execute a method of transmitting a markup document performed on a mobile device, the method comprising:
    creating a markup document using a mobile device indicating certain predetermined content as fixed parts and other predetermined content as variable parts, the fixed parts including a layout of the markup document, the variable parts including at least one image corresponding to the layout, at least one text corresponding to the layout, and a modified layout of the markup document adjusted by a user, and creating of the markup document including creating Multi-purpose Internet Mail Extensions (MIME)-Multiplexed format data containing the markup document as the fixed parts and the variable parts; and requesting a printing of the markup document from the mobile device by separately transmitting the fixed parts and the variable parts to a printer, wherein the requesting includes requesting a printing of the markup document by separately transmitting the fixed parts and the variable parts without creating the entire MIME-Multiplexed format data in the mobile device.

8. A printing method comprising:

separately receiving from a mobile device fixed parts and variable parts included in a markup document created on the mobile device that respectively indicate certain predetermined content, the fixed parts including a layout of the markup document, the variable parts including at least one image corresponding to the layout, at least one text corresponding to the layout, and a modified layout of the markup document adjusted by a user, and creating of the markup document including creating Multi-purpose Internet Mail Extensions (MIME)-Multiplexed format data containing the markup document as the fixed parts and the variable parts;

analyzing the received fixed parts and the received variable parts as a single markup document, the received fixed parts and received variable parts being transmitted separately by the mobile device without creating the entire MIME-Multiplexed format data in the mobile device; and printing a result of the analysis.

9. The printing method according to claim 8, wherein the separate receiving of the fixed parts and the variable parts comprises receiving fixed parts and variable parts of Multi-purpose Internet Mail Extensions (MIME)-Multiplexed format data containing the markup document, and wherein the printing method further comprises discarding the MIME-Multiplexed format data except for the fixed parts and variable parts containing the markup document.

10. A non-transitory computer readable writing medium having a computer readable program stored thereon to execute a printing method comprising:

separately receiving from a mobile device fixed parts and variable parts included in a markup document created on the mobile device that respectively indicate certain predetermined content, the fixed parts including a layout of the markup document, the variable parts including at least one image corresponding to the layout, at least one text corresponding to the layout, and a modified layout of the markup document adjusted by a user, and creating of the markup document including creating Multi-purpose Internet Mail Extensions (MIME)-Multiplexed format data containing the markup document as the fixed parts and the variable parts;

analyzing the received fixed parts and the received variable parts as a single markup document, the received fixed parts and received variable parts being transmitted separately by the mobile device without creating the entire MIME-Multiplexed format data in the mobile device; and printing a result of the analysis.

11. An image print requesting unit of a mobile device that communicates with an image forming apparatus to print a markup document, comprising:

a display to display a markup document to be printed and to interface with a user such that the user inputs information related to the markup document;

a template storage to store templates, each of which is divisible into a fixed part and a variable part that is modifiable according to the input information, the fixed part including a layout of the markup document, the variable part including at least one image corresponding to the layout, at least one text corresponding to the layout; and a computer that executes:

a content determiner to determine a layout of the displayed markup document by selecting one of the templates corresponding to content determined from the user inputted information;

a style adjuster to adjust a layout of the variable parts of the selected template for the markup document in accordance with the determined content and the input information;

a transfer data creator to create fixed and variable parts of print data to be transmitted to the image forming apparatus by a separation of the fixed and the adjusted variable parts of the selected template, and to create Multi-purpose Internet Mail Extensions (MIME)-Multiplexed format data containing the markup document as the fixed and variable parts without creating the entire MIME-Multiplexed format data in the mobile device; and a transmitter to separately transmit the created fixed and variable parts of the print data to the image forming apparatus.

12. The image print requesting unit according to claim 11, wherein each template is stored in a format containing basic information, template data, a creation list, a fixed part list, and a variable part list.

13. The image print requesting unit according to claim 12, wherein the template storage unit employs a data structure comprising a field in which the template basic information is recorded, a field in which the template data is recorded, a field in which the creation list is recorded, a field in which the fixed part list is recorded, and a field in which the variable part list is recorded.

14. The image print requesting unit according to claim 12, wherein the template basic information comprises template identification (ID), a template name, and a template description, which correspond to information that identifies each template and which are provided to the user to allow for a selection of a user desired layout.

15. The image print requesting unit according to claim 12, wherein the template data comprises data that is used by the transfer data creator and data of a template that includes the fixed parts and the variable parts.

16. The image print requesting unit according to claim 15, wherein the template data comprises Multi-purpose Internet Mail Extensions (MIME)-Multiplexed format extensible hyper text markup language (XHTML)-Print data that contains metadata required for the markup document and a MIME-Multiplexed protocol used in the communications between the mobile device and the image forming apparatus.

17. The image print requesting unit according to claim 12, wherein the creation list comprises information that indicates a number of the fixed parts, a number of the variable parts, and an arrangement order of the fixed parts and the variable parts, which are included in each template.

18. The image print requesting unit according to claim 12, wherein the fixed part list comprises information to identify each of the fixed parts included in each template.

19. The image print requesting unit according to claim 12, wherein the variable part list comprises information to identify each of the variable parts included in each template.

20. The image print requesting unit according to claim 11, further comprising a user interface unit, wherein the determination made by the content determiner is made in accordance with a value input by the user via the user interface unit.

21. The image print requesting unit according to claim 11, wherein the fixed parts are fixed markup parts corresponding to the content layout, and the variable parts are user modifiable variable attribute values of the markup document.

22. The image print requesting unit according to claim 21, wherein the mobile device comprises a cell phone, a camera, and/or a media player.

23. A system to provide for network printing capabilities comprising the image print requesting unit of claim 21 and the image forming apparatus with which the image print requesting unit communicates.

* * * * *

UNITED STATES PATENT AND TRADEMARK OFFICE
CERTIFICATE OF CORRECTION

PATENT NO.         : 8,700,989 B2                                            Page 1 of 1
APPLICATION NO.    : 11/678181
DATED              : April 15, 2014
INVENTOR(S)        : Dae-Hyun Kim It is certified that error appears in the above-identified patent and that said Letters Patent is hereby corrected as shown below:

Claims

Claim 2, Column 10, Line 28-30:

Delete "document, and the variable parts further comprise a modifiable variable attribute value portion of the markup document." and insert --document.--, therefor.

Signed and Sealed this
First Day of March, 2016

Michelle K. Lee
*Director of the United States Patent and Trademark Office*